Patented July 4, 1950

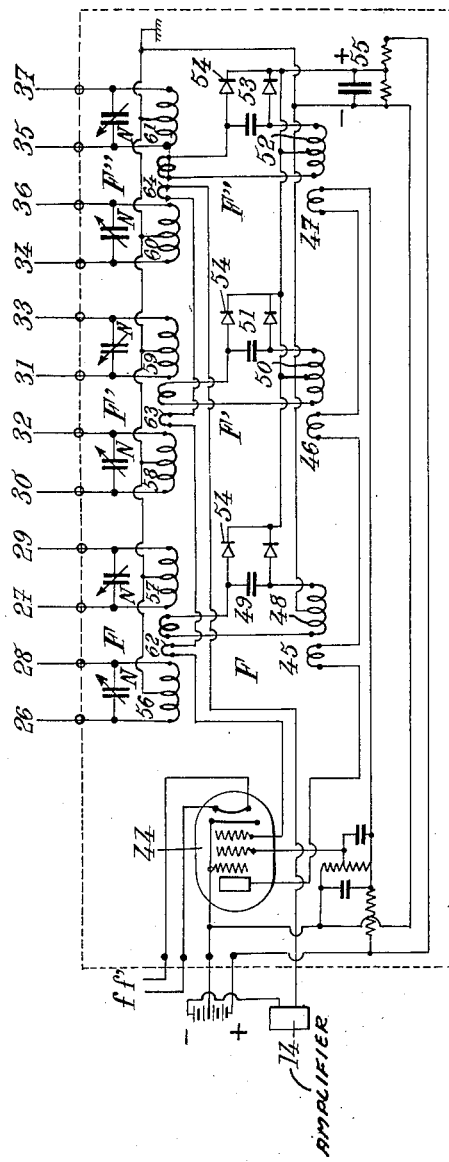

2,513,760

UNITED STATES PATENT OFFICE 2,513,760

GENERATOR OF MULTIPLE VOLTAGES AT DIFFERENT FREQUENCIES

Pierre Marie Gabriel Toulon, Neuilly-sur-Seine, France

Application July 14, 1947, Serial No. 760,837
In France February 2, 1939

Section 1, Public Law 690, August 8, 1946
Patent expires February 2, 1959

9 Claims. (Cl. 250—36)

1

The present invention relates to generators capable of supplying a plurality of voltages at different frequencies respectively.

Its object is to provide a generator of this kind which is better adapted to meet the requirements of practice than those used for the same purpose up to the present time and in particular which is simpler and less expensive.

A preferred embodiment of my invention will be hereinafter described with reference to the accompanying drawings, given merely by way of example and in which the only figure is a diagrammatical view of a generator made according to an embodiment of my invention.

The generator shown by the drawing is intended to supply the respective voltages necessary for feeding terminals 26, 27, 28, 29 at frequency F, terminals 30, 31, 32, 33 at frequency F', and terminals 34, 35, 36, 37 at frequency F'', and this by means of a single tube. As shown by the drawing, this tube 44, itself controlled by synchronizing signals received in an amplifier 14, has its plate circuit connected with windings 45, 46, 47 mounted in series. Winding 45 exerts an inductive action on the circuit oscillating at frequency F, which includes inductance coil 48 and capacitor 49. Likewise, winding 46 exerts an inductive action on circuit 50, 51 oscillating at frequency F'', and winding 47 exerts an inductive action on circuit 52, 53 oscillating at frequency F''. Each of the windings of coils 48, 50, 52 has an accessible neutral point. I connect these various neutral points together and with the negative terminal of a direct current source 55, which may be a voltage dividing potentiometer connected with the main distribution system. On the other hand, each condenser 49, 51, 53 is connected to the anode of a cuprous oxide rectifier 54. The cathodes of these respective rectifiers are connected together and with the other end of the direct current source 55. The object of these rectifiers is to stabilize the amplitude of the oscillations for each frequency F, F', F'' and to eliminate the possibility of one of the frequencies assuming an exaggerated amplitude to the detriment of the others.

Oscillatory circuit 48—49 exerts an inductive action on two independent oscillating circuits 56 and 57, respectively, tuned slightly above and slightly below resonance to frequency F. In these conditions, I obtain, at the terminals 26—29—27—28 of these two circuits, voltages respectively in lead of 45° and in lag of 45°, therefore at 90° to each other. These oscillating circuits feed the four terminals 26, 27, 28 and 29, the neutral point

2 of the inductance coils being connected to the earth.

Likewise, oscillating circuit 50—51 acts on oscillating circuits 58 and 59 coupled above and below resonance to frequency F'. These new circuits supply the four terminals 30, 31, 32, 33. And oscillating circuit 52, 53 acts on oscillating circuits 60 and 61 respectively tuned above and below resonance frequency F''. These circuits supply terminals 34, 35, 36, 37.

The control grid of tube 44 is supplied through windings 62, 63, 64 connected in series and respectively coupled with the circuits at frequencies F, F', F''.

The operation of the tube 44 is easily understood. The alternating voltage produced in winding 62 acts upon the grid of tube 44 and produces a plate current which contributes in maintaining oscillations in oscillating circuit 48—49.

Simultaneously, the voltage produced in coil 63 maintains the oscillations of circuit 50—51 and the voltage produced in coil 64 maintains the oscillations of circuit 52—53. These various actions are simultaneously exerted in tube 44 the grid of which further receives synchronizing impulses from amplifier 14, as above stated. The amplitude of the oscillations at each frequency remains stable because rectifiers 54 start supplying current as soon as the maximum amplitude of the oscillating circuit voltage exceeds that of polarization battery 55. I thus limit the amplitude of the induced voltage in each of the coils 62, 63, 64 to a value sufficiently low for preventing saturation of triode 44.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A generator of multiple voltages of different unrelated frequencies which comprises, in combination, an oscillator tube, a plurality of oscillatory circuits of different respective natural frequencies, each of said circuits including an inductive winding and a capacitor, a corresponding plurality of inductive windings coupled to the plate circuit of said tube, said inductor windings being coupled each with one of said oscillatory circuits, a corresponding plurality of windings coupled to the control grid circuit of said tube, each of said last mentioned windings being coupled with one of said oscillatory circuits, and means for limiting the amplitude of the oscillations in each of said oscillatory circuits.

2. A generator of multiple voltages of different unrelated frequencies which comprises, in combination, an oscillator tube, a plurality of oscillatory circuits of different respective natural frequencies, each of said circuits including an inductive winding and a capacitor, a plurality of inductive windings coupled with the plate circuit of said tube, said inductive windings being coupled each with one of said oscillatory circuits, a plurality of windings coupled with the control grid circuit of said tube, said last mentioned windings being coupled each with one of said oscillatory circuits, at least two rectifiers connected across the terminals of each of said capacitors, respectively, and means for biasing said rectifiers to limit the amplitude of the oscillations in each of said oscillatory circuits.

3. A generator according to claim 2 in which said means for biasing is common to said rectifiers.

4. A generator according to claim 2 in which said means for biasing is adapted to exert an equal action on said rectifiers.

5. A generator according to claim 1 wherein is further provided a plurality of pairs of further oscillatory circuits, one of said pairs coupled respectively with each of said first mentioned oscillatory circuits, the oscillatory circuits of each of said pairs tuned to frequencies selected to provide polyphase voltages.

6. A generator in accordance with claim 1 wherein is further provided a plurality of pairs of further oscillatory circuits, one of said pairs coupled respectively with each of first mentioned oscillatory circuits, the oscillatory circuits of each of said pairs tuned respectively above and below the frequency of said first mentioned oscillatory circuits by an amount adapted to provide a phase difference of 90° in the voltages provided by the respective oscillatory circuits of said pairs.

7. A generator according to claim 2 wherein is further provided a plurality of pairs of further oscillatory circuits, one of said pairs coupled respectively with each of said first mentioned oscillatory circuits, the oscillatory circuits of each of said pairs tuned to frequencies selected to provide polyphase voltages.

8. A generator in accordance with claim 2 wherein is further provided a plurality of pairs of further oscillatory circuits, one of said pairs coupled respectively with each of said first mentioned oscillatory circuits, the oscillatory circuits of each of said pairs tuned respectively above and below the frequency of said first mentioned oscillatory circuits by an amount adapted to provide a phase difference of 90° in the voltages provided by the respective oscillatory circuits of said pairs.

9. A generator of multiple voltages of different frequencies which comprises, in combination, at least one oscillator tube, a plurality of oscillatory circuits of different respective natural frequencies, each of said circuits including an inductive winding and a capacitor, a coupling circuit inserted in the plate circuit of said tube, said coupling circuit being coupled with all of said oscillatory circuits, a coupling circuit inserted in the control grid circuit of said tube, said last mentioned coupling circuit being coupled with all of said oscillatory circuits, at least two rectifiers connected across the terminals of each of said capacitors, respectively, and means for biasing said rectifiers to limit the amplitude of the oscillations in each of said oscillatory circuits.

PIERRE MARIE GABRIEL TOULON.

REFERENCES CITED

The following references are of record in the file of this patent:

UNITED STATES PATENTS

| Number | Name | Date |
|---|---|---|
| 1,446,752 | Kendall | Feb. 27, 1923 |
| 2,059,587 | Klotz | Nov. 3, 1936 |